United States Patent
Young et al.

(10) Patent No.: US 7,158,717 B2
(45) Date of Patent: Jan. 2, 2007

(54) APPARATUS FOR ALTERING A TEMPERATURE STATE OF A LIQUID WITHIN A CONTAINER AND METHOD OF USE

(76) Inventors: Frank Young, 1363 N. Garlock, Ridgecrest, CA (US) 93555; Stacey Young, 1363 N. Garlock, Ridgecrest, CA (US) 93555

( * ) Notice: Subject to any disclaimer, the term of this patent is extended or adjusted under 35 U.S.C. 154(b) by 0 days.

(21) Appl. No.: 11/101,129

(22) Filed: Apr. 7, 2005

(65) Prior Publication Data
US 2006/0239667 A1    Oct. 26, 2006

(51) Int. Cl.
*A01K 63/06* (2006.01)
(52) U.S. Cl. .................. 392/444; 219/521; 126/265
(58) Field of Classification Search .............. None
See application file for complete search history.

(56) References Cited

U.S. PATENT DOCUMENTS

| | | | | |
|---|---|---|---|---|
| 2,843,719 | A | * | 7/1958 | Smith .................. 392/336 |
| 2,992,316 | A | * | 7/1961 | Baumstein et al. ......... 219/441 |
| 3,385,950 | A | * | 5/1968 | Lipor .................. 392/333 |
| 3,805,440 | A | * | 4/1974 | Becker ................. 446/418 |
| D257,549 | S | * | 11/1980 | Chapman .................. D7/326 |
| 6,417,498 | B1 | * | 7/2002 | Shields et al. ............. 219/521 |
| 6,444,956 | B1 | * | 9/2002 | Witcher et al. ............ 219/429 |
| 6,703,590 | B1 | * | 3/2004 | Holley, Jr. ................. 219/432 |
| 2004/0168684 | A1 | * | 9/2004 | Shapiro et al. ............ 126/265 |

\* cited by examiner

*Primary Examiner*—Thor S. Campbell
(74) *Attorney, Agent, or Firm*—Raymond M. Galasso; Galasso & Associates, LP

(57) ABSTRACT

An apparatus for altering a temperature state of a liquid within a container and method of use are disclosed. In one form, an apparatus includes an oval housing having a top portion, a bottom portion, and a middle portion having a front side and a rear side. The said top portion has a width and a depth. A plurality of cavities is positioned along the width and has substantially cylindrical openings. The cavities are sized to receive a portion of a liquid container. Heat generating electronics are housed within the housing. The heat generating electronics include a heat transfer element integrated as part of each cavity. The heat transfer element is operable to alter a temperature state of a cavity. A heat generator is mounted within the housing and is thermally coupled to the heat transfer element to collectively alter a temperature state of each of the cavities. A thermostat is operably coupled to the heat generator to alter the temperature state of each of the cavities. A power source is operably coupled to the electronics to power the electronics.

13 Claims, 7 Drawing Sheets

APPARATUS FOR ALTERING A TEMPERATURE STATE OF A LIQUID WITHIN A CONTAINER AND METHOD OF USE

FIELD OF THE DISCLOSURE

The invention relates to warming liquid stored in a container, and more particularly to an apparatus for altering a temperature state of a liquid within a container and method of use.

BACKGROUND

Products such as shampoo, conditioner, shaving cream, shower gel, and other liquid personal hygiene accessories are commonly used in a bathroom while a person is showering or bathing. Warm robes, thick towels, heat lamps, other types of bathroom heaters, and other products are used to make a person warm and comfortable during a shower or bath. During a bath or shower, people often use warm water to maintain their comfort level.

Applying a cold liquid product directly on a person's skin causes discomfort and is undesirable. This problem arises when one tries to use shampoo, conditioner, shaving cream, shower gel, or other liquid personal hygiene accessories that are of an undesired temperature. For example, the temperature of various liquids inside of a container may be less than the temperature within a shower. As such, a user is uncomfortable during their bathing experience. In particular, cold climates tend to cool liquids greatly relative to a temperature within, for example, a shower or bathtub. It would be desirable to increase the temperature of liquids prior to their application or use.

BRIEF DESCRIPTION OF THE DRAWINGS

Other advantages, features and characteristics of the invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE FIGURES

An apparatus for altering a temperature state of a liquid within a container and method of use are disclosed. In one form, an apparatus includes an oval housing having a top portion, a bottom portion, and a middle portion having a front side and a rear side. The top portion has a width and a depth. A plurality of cavities is positioned along the width and has substantially cylindrical openings. The cavities are sized to receive a portion of a liquid container. Heat generating electronics are housed within the housing. The heat generating electronics include a heat transfer element integrated as part of each cavity. The heat transfer element is operable to alter a temperature state of a cavity. A heat generator is mounted within the housing and is thermally coupled to the heat transfer element to collectively alter a temperature state of each of the cavities. A thermostat is operably coupled to the heat generator to alter the temperature state of each of the cavities. A power source is operably coupled to the electronics to power the electronics.

In a particularized form, an apparatus for altering a temperature state of a liquid within a container includes an oval shaped housing having a top portion, a bottom portion, and a middle portion having a front side and a rear side. The top portion has a width and a depth. The oval shaped housing contains three cavities having substantially cylindrical openings. The cavities are sized to receive a portion of a liquid container. The cavities are positioned along the width and approximately centered along the width. Heat generating electronics are housed within the housing. The heat generating electronics include a heat transfer element integrated as part of each cavity. The heat transfer element is operable to alter a temperature state of a cavity. A heat generator is mounted within the housing and is thermally coupled to the heat transfer element to collectively alter a temperature state of each of the cavities. A thermostat is operably coupled to the heat generator to alter the temperature state of each of the cavities. A power source is operably coupled to the electronics to power the electronics. In this manner, a person may heat the liquid within a container to a desired temperature and remain comfortable when applying the liquid to their skin.

Figure 1:
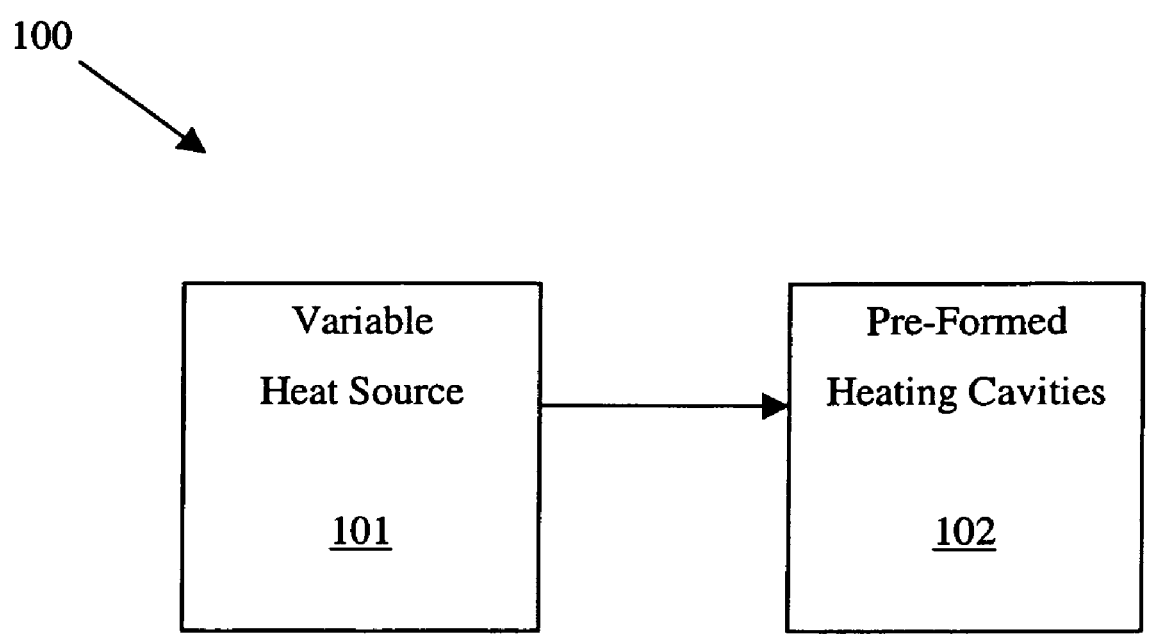
FIG. 1 illustrates a functional block diagram of apparatus for altering a temperature state of a liquid within a container according to one embodiment of the invention.

FIG. 1 illustrates a functional block diagram of apparatus for altering a temperature state of a liquid within a container according to one embodiment of the invention. A personal hygiene product warmer, illustrated generally at 100, includes a variable heat source operable to set a temperature of a plurality of preformed heating cavities 102. Preformed heating cavities are sized to accommodate containers (not expressly shown) housing one or more types of personal hygiene products. For example, a first container may include a shampoo and a second container may contain a lotion. Various types of personal hygiene products may be heated including, but not limited to, shampoos, conditioners, shaving creams, shower gels, hair gels, body lotions or any other type of personal hygiene product that may benefit from having an altered temperature state prior to use.

During use, a user may benefit from adjusting variable heat source to warm a shampoo, conditioner and shaving cream prior to taking a shower. For example, a user may place a container having each product within preformed heating cavities 102 and adjust variable heat source 101 to warm each product. In this manner, three different products may be warmed to a desired temperature using three preformed heating cavities 102 enabling efficient use of a user's time when preparing to go to work or other functions.

Figure 2:
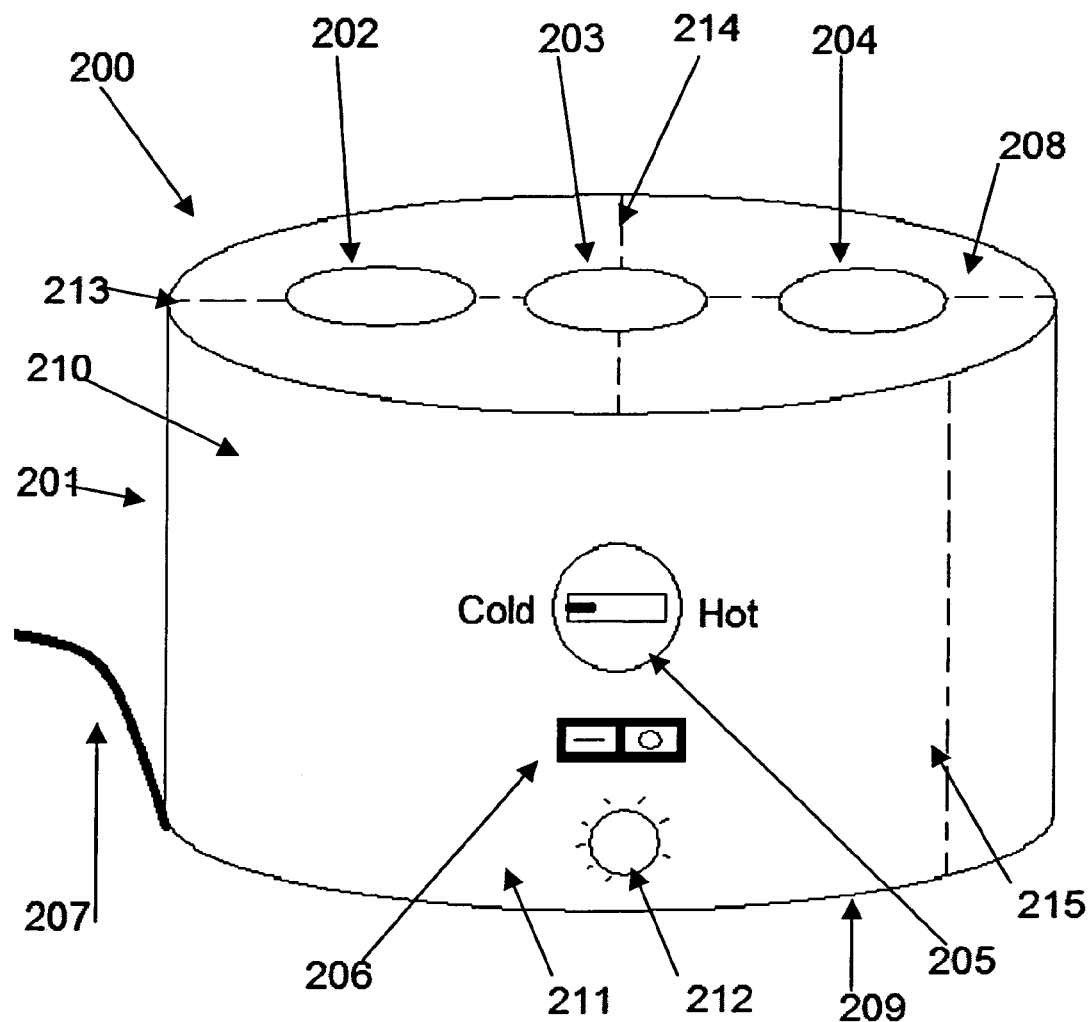
FIG. 2 illustrates a front perspective view of an apparatus for altering a temperature state of a liquid within a container according to one embodiment of the invention.

FIG. 2 illustrates a front perspective view of an apparatus for altering a temperature state of a liquid within a container according to one embodiment of the invention. An apparatus for altering a temperature state of a personal hygiene product within a container, is illustrated generally as personal hygiene product warmer 200, and includes oval shaped housing 201 having top portion 208, bottom portion 209, and middle portion 210 having front side 211 and rear side (not expressly shown). Personal hygiene product warmer 200 further includes a first cavity 202, a second cavity 203, and a third cavity 204 positioned along a width 213 and a depth 214 of top portion 208 of oval shaped housing 206. First cavity 202, second cavity 203 and third cavity 204 include substantially cylindrical openings and are sized to receive a portion of a liquid container (not expressly shown). Personal hygiene product warmer 200 further includes thermostat control knob 205 centered along a portion of front side 211 and power switch 206 for activating or power personal hygiene product warmer 200 Oval shaped housing 201 may be provided with a height 215 between approximately four (4) and five (5) inches and a depth 214 ranging between approximately five (5) and six (6) inches. Oval shaped housing 201 may also include a width 213 of approximately twelve (12) inches.

During use, a user places power switch 206 to an on position and inserts liquid containers (not expressly shown) within one or more of first cavity 202, second cavity 203, and/or third cavity 204. A user may adjust thermostat control knob 205 to a desired temperature setting (e.g. between cold and hot) to alter a temperature state of a personal hygiene product. For example, a user may only place a container within first cavity 202 and third cavity 204. As such, each container may be heated to a desired temperature as set by thermostat 205. In one embodiment, a container detection sensor (not expressly shown) may be provided in association with each cavity. As such, when a user places a container within a cavity, only that cavity may be activated to alter a temperature state of a personal hygiene product contained within a container. When desired temperature is achieved, illuminator 212 illuminates to indicate that a personal hygiene product is warmed. A user may then place power switch 206 to an off and remove the liquid container from oval shaped housing 201. In this manner, simultaneously warm various personal hygiene products prior to use obviating the need to sequentially warm a product using a single product warmer.

Figure 3:
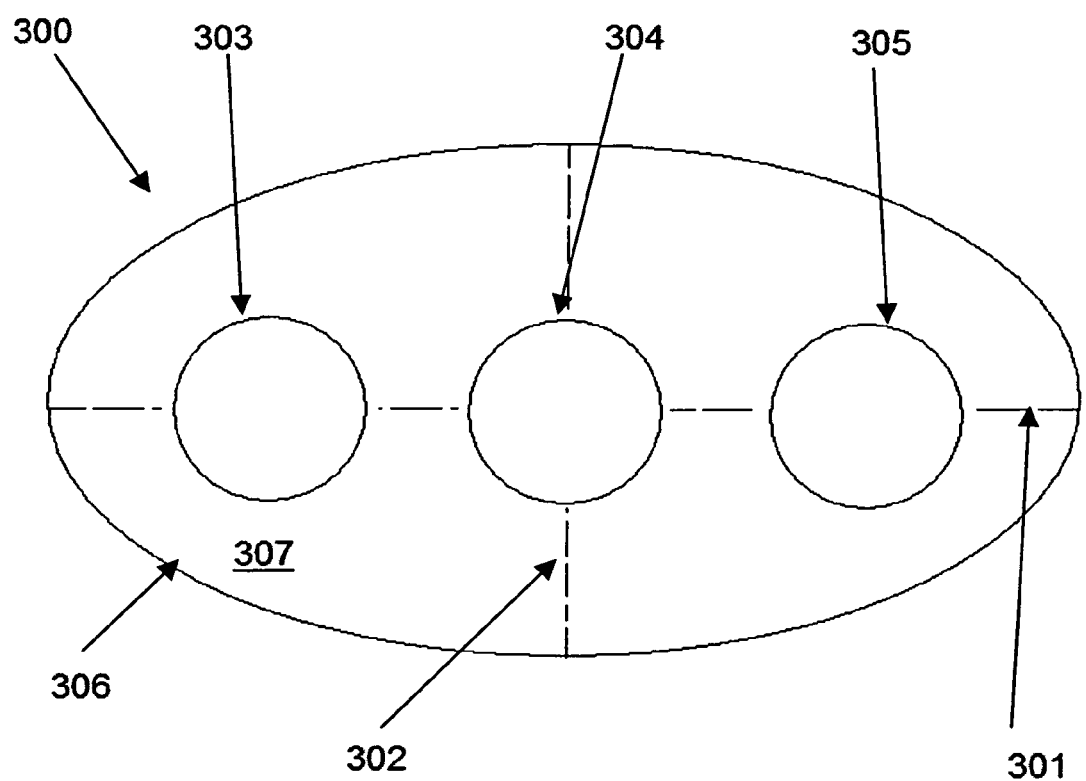
FIG. 3 illustrates a top perspective view of an apparatus for altering a temperature state of a liquid within a container according to one embodiment of the invention.

FIG. 3 illustrates a top perspective view of an apparatus for altering a temperature state of a liquid within a container according to one embodiment of the invention. An apparatus for altering a temperature state of a liquid within a container, illustrated generally as personal hygiene product warmer 300, includes a top portion 307 of oval shaped housing 306. Top portion 307 includes a width 301 and depth 302. Personal hygiene product warmer 300 further includes a first cavity opening 303, a second cavity opening 304 and a third cavity opening 305 cylindrically shaped and positioned along width 301 and centered to width 301. Second cavity opening 304 is approximately centered to width 301 and depth 302 of top portion 307. Positioning each cavity opening 302, 303, and 304 approximately centered to width 301 allows for easy access to containers when placed within each cavity (not expressly shown). However in other embodiments, each cavity opening may be provided in other arrangements, such as along a front portion of oval shaped housing, a rear portion of oval shaped housing, or in other various arrangements such as triangular, etc. Additionally, personal hygiene product warmer 400 may also include less then three or greater than three cavities for altering a temperature state of a liquid.

Figure 4:
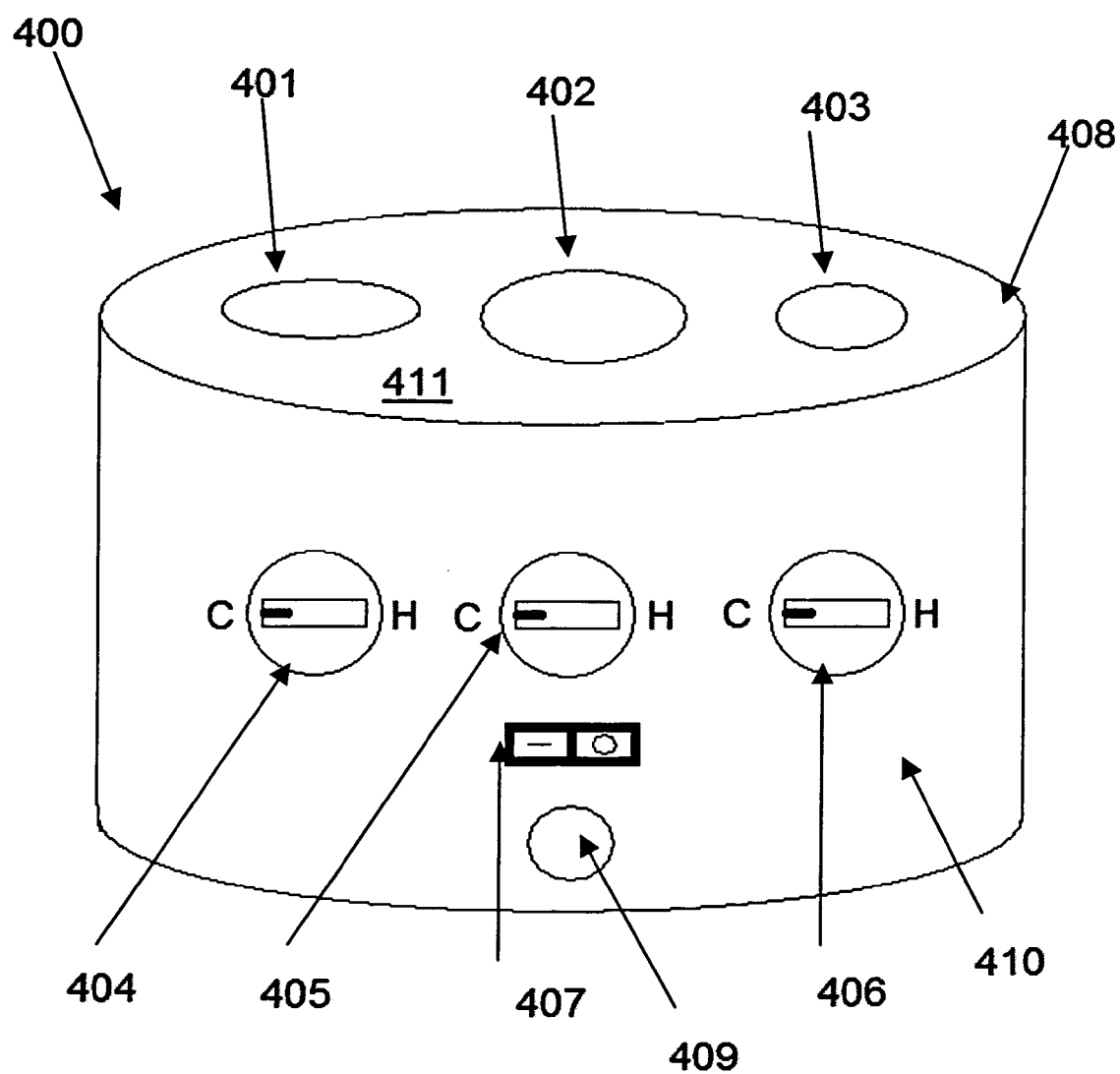
FIG. 4 illustrates a front perspective view of an apparatus for altering a temperature state of a liquid within a container according to one embodiment of the invention.

FIG. 4 illustrates a front perspective view of an apparatus for altering a temperature state of a liquid within a container according to one embodiment of the invention. Apparatus for altering a temperature state of a liquid within a container, illustrated generally as personal hygiene product warmer 400, includes a substantially waterproof oval shaped housing 408 and a first cavity 401, a second cavity 402 and a third cavity 403. Each cavity 401, 402 and 403 include different dimensions and are positioned along top portion 411 and include substantially cylindrical openings sized to receive a portion of a liquid container (not expressly shown). Personal hygiene product warmer 400 further includes a first thermostat control knob 404 operably coupled to first cavity 401, a second thermostat control knob 405 operably coupled to second cavity 402, and a third thermostat control knob 406 operably coupled to third cavity 403. Power switch 407 is accessible via a front portion 410 of oval shaped housing 408.

During use, a user activates power switch 407 and places a liquid container (not expressly shown) within one or more cavity 401, 402, and/or 403. A user adjusts one or more thermostat control knobs 404, 405, and/or 406 based on which cavity is being used. For example, a user may adjust first thermostat control knob 404 to a desired temperature setting for first cavity 401, second thermostat control knob 405 to a desired temperature setting for second cavity 402, and third thermostat control knob 406 to a desired temperature setting for third cavity 403. When a temperature for each setting is reached, illuminator 409 illuminates indicating to a user that a desired temperature state has been achieved. In other embodiments, more than one illuminator may be provided for each cavity and illuminated based on providing the desired temperature. Upon a user removing the container(s), a user may place the power switch 407 to an off position. However in other embodiments a timer (not expressly shown) may be provided to automatically turn on or off personal hygiene product warmer 400 for safety purposes. For example, an individual may desire to have personal hygiene product warmer 400 to heat or warm a product prior to waking. As such, a timer may be provided to ensure scheduled heating of products using personal hygiene product warmer 400. Additionally, a timer may be provided to turn off personal hygiene product 400 after a period of time has elapsed (e.g. 30 minutes, 60 minutes, etc.). The timer may be a fixed or variable timer allowing a user to set the length of time personal hygiene product warmer 400 heats or warms a product.

Figure 5:
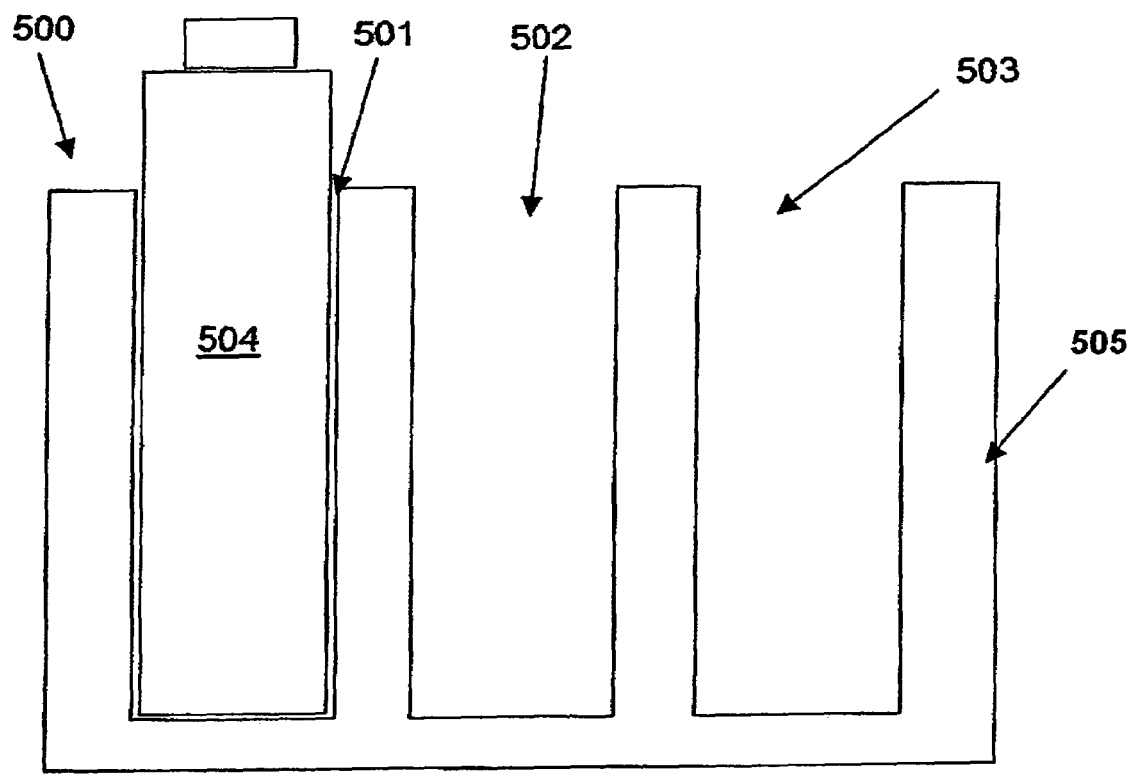
FIG. 5 illustrates a cross-sectional side view a of an apparatus for altering a temperature state of a liquid within a container according to one embodiment of the invention.

FIG. 5 illustrates a cross-sectional side view of an apparatus for altering a temperature state of a liquid within a container according to one embodiment of the invention. An cross-sectional view of an apparatus for altering a temperature state of a liquid within a container, illustrated generally as personal hygiene product warmer 500, includes a housing 505 having a first cavity 501 cylindrically shaped to receive a liquid container 504, a second cavity 502, and a third cavity 503. Liquid container 504 includes a durable plastic that may be filled and refilled with a personal hygiene product to be warmed. Liquid container 502 includes a durable plastic that is heat conductive and able to withstand various temperature changes. Liquid container 504 and housing 505 may be manufactured using one or more plastic forming manufacturing processes such as a plastic molding, plastic extruding, plastic blowing and the like. For example, a plastic manufacturing process of injection molding or blow molding may be used to housing 505 having first cavity 501, second cavity 502 and third cavity 503. Injection molding is a process that is used in mass production of materials and includes melted plastic material being forcefully injected into a relatively cool mold. As the plastic material hardens, it takes on the shape of the mold cavity. One skilled in the art can appreciate that other methods may be employed to provide housing 505 and liquid container 502 either alone or in combination with other manual or automatic fabrication methods.

Figure 6:
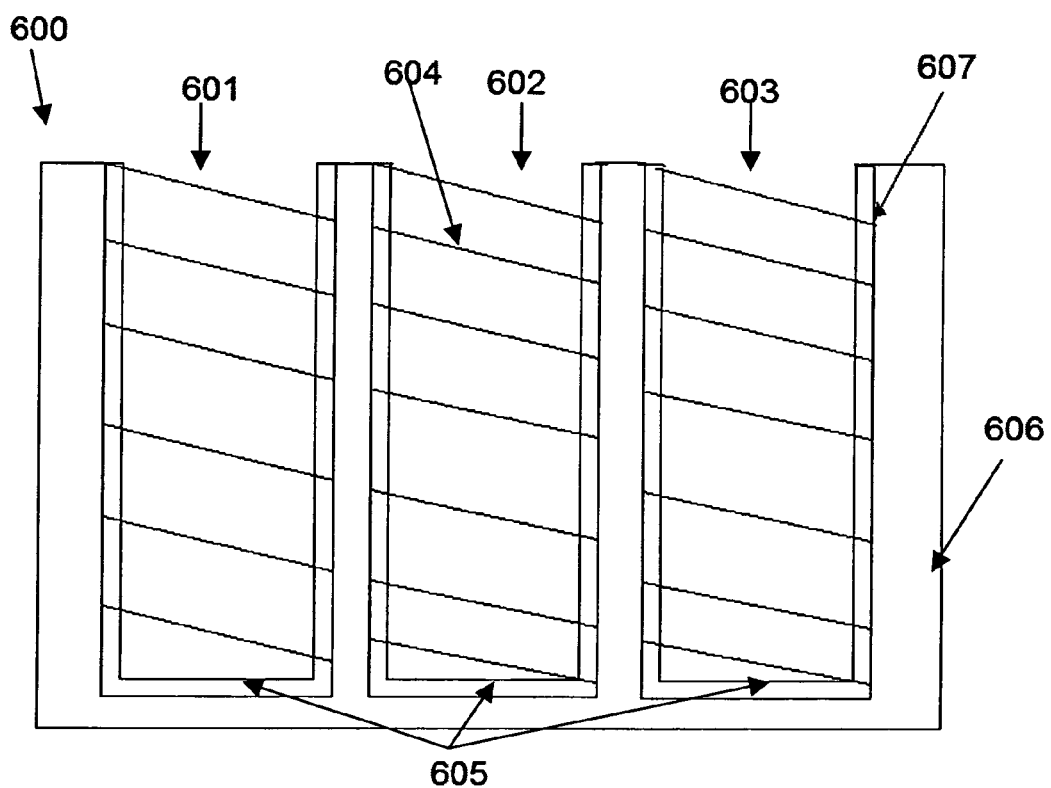
FIG. 6 illustrates a cross-sectional side view of an apparatus for altering a temperature state of a liquid within a container according to one embodiment of the invention.

FIG. 6 illustrates a cross-sectional side view of an apparatus for altering a temperature state of a liquid within a container according to one embodiment of the invention. Apparatus for altering a temperature state of a liquid within a container, illustrated generally as personal hygiene product warmer 600, includes oval shaped housing 603. Personal hygiene product warmer 600 includes a thermally conductive material 605 integrated as part of each cavity 601, 602, and 603. A heat transfer element 604 such as an electrically conductive wire, thermal element, etc. is coupled to each thermally conductive material 605 to increase or decrease a temperature state of each cavity 601, 602, and 603. In one embodiment, thermally conductive material 605 may include a combination of materials such as durable plastic material having aluminum layer 607 formed as a part of each cavity 601, 602 and 603. Aluminum materials are well known in the art to provide excellent heat conduction and may be easily formed into various shapes and sizes. Some conventional aluminum manufacturing includes an extrusion process where aluminum is heated to approximately 400 to 500 degrees Celsius and formed. As such, an aluminum layer 607 of material for each cavity may be operated at temperatures less than 400 degrees Celsius for warming a personal hygiene product and not causing damage to aluminum layer 607 and/or cavities 601, 602, and 603. Heat transfer element 604 may then be coupled to thermally conductive material 605 having an aluminum layer 607 to alter a temperature state of cavities 601, 602, 603. Additionally, a separate thermostat may also be associated with each cavity and may include a separate heat transfer element 604 to increase or decrease a temperature state of each cavity.

Figure 7:
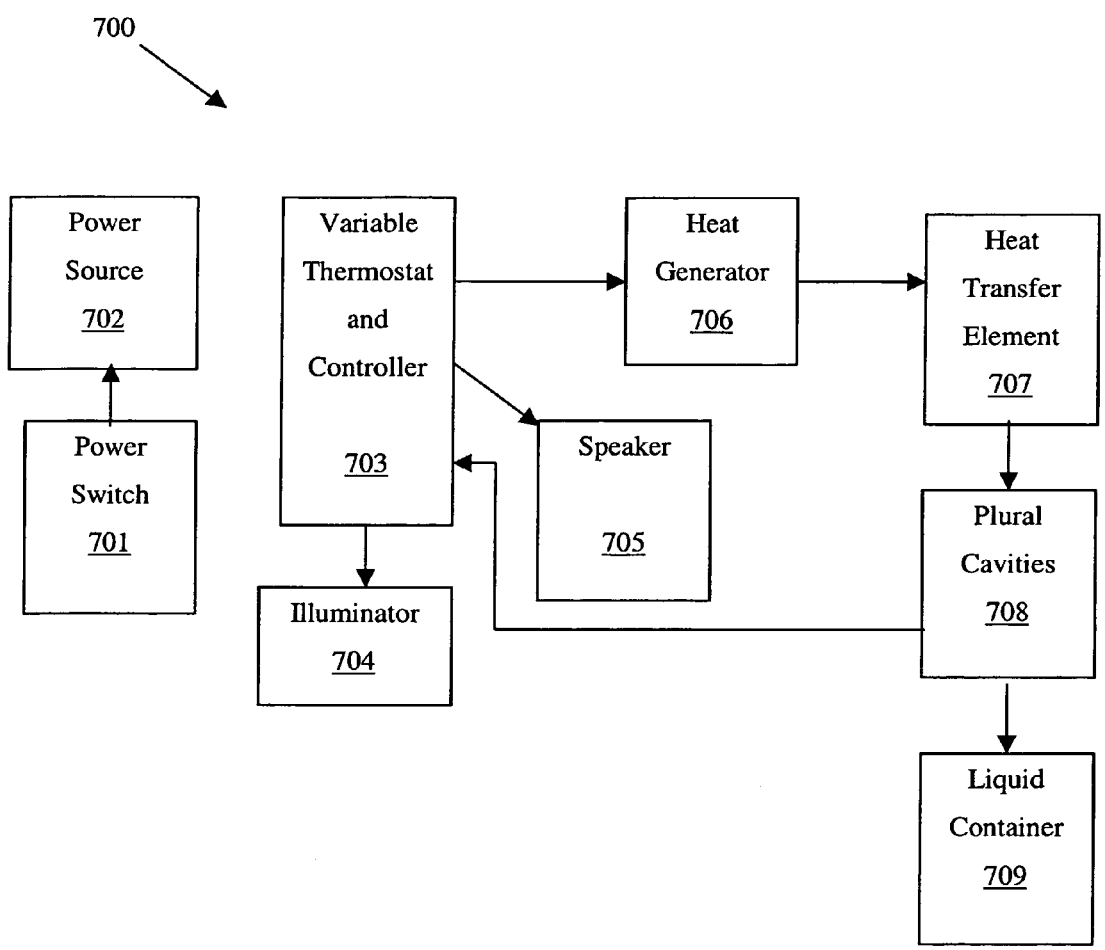
FIG. 7 illustrates a functional block diagram of an apparatus for altering a temperature state of a liquid within a container according to one embodiment of the invention.

FIG. 7 illustrates a functional block diagram of an apparatus for altering a temperature state of a liquid within a container according to one embodiment of the invention. An apparatus for altering a temperature state of a liquid, illustrated generally as personal hygiene product warmer 700, includes a power switch 701 operably coupled to power source 702 such as a direct current (DC) power source or an alternating current (AC) power source for supplying power to electronics of warming apparatus 700. In one embodiment, power source 702 may include one or more batteries (not expressly shown) operable to provide a DC power source. For example, personal hygiene product warmer 700 may be used in a remote location where power may not be available. In another embodiment, power source 702 may include utilize an AC power source and may be coupled to a wall outlet using power cord (not expressly shown). An AC power adapter may also be employed to convert AC power to DC power for use by personal hygiene product warmer 700.

Personal hygiene product warmer 700 further includes a variable thermostat and controller 703 operably coupled to heat generator 706 to alter a temperature of cavity 708 to a desired level. In one embodiment, variable thermostat and controller 703 may include adjustable thermostats such as mechanical thermostats or digital thermostats. A mechanical thermostat generally includes bi-metal coil that contracts and expands with an operating temperature. Movement of the bi-metal coil activates or controls a switch that opens or closes a circuit operable to make heat generator 706 turn on or off and feedback may be provided by plural cavities 708 to determine if an operating state of a bi-metal coil. In another embodiment, a digital thermostat may be employed. Digital thermostats use a thermistor proximally located to plural cavities 708 and operable to provide feedback of a measured temperature for one or more of plural cavities 708. For example, a thermistor is a resistor whose electrical resistance changes with temperature and may activate or control a switch that opens or closes a circuit operable to make enable and disable heat generator 706. Thermostat and controller 703 is further operably coupled to illuminator 704 and speaker 705 and may provide a signal to activate illuminator 704 and/or speaker 705 when plural cavities 708 reaches a desired temperature as set by a thermostat controller (not expressly shown). For example, when one or more of plural cavities 708 reaches a desired temperature as set by thermostat and controller 703, a signal sufficient to illuminate illuminator 704 may be provided by thermostat and controller 703 indicating to a user that a desired temperature has been achieved. Similarly, speaker 705 may output an audio (i.e. buzzer, alarm, chime, etc.) sufficient to alert a user that a desired temperature has been achieved. In this manner, audio and visual indicators may be provided to a user thereby eliminating a need for a user to remove a container and test the content's temperature.

In one embodiment, heat generator 706 may include metallic coils (not expressly shown) operable to produce infrared heat for altering a temperature state of one or more of plural cavities 708. Other heat generating devices or sources may also be used. Heat generator 706 is coupled to a heat transfer element 707 operable to transfer heat from heat generator 706 to one or more of plural cavities 798. Cavity 708 includes a thermally conductive material or a combination of materials to facilitate transferring energy provided by heat generator 706. For example, a thermal conductor such as aluminum may be coupled to a thermally conductive material such as a durable high temperature plastic material and provided as a part of cavity 708. Other types of conductors may also be used including steel, copper, or any other thermally conductive metal or material.

During use, a user may place power switch 701 to an on position and place one or more liquid container(s) 709 within cavities 708. A user adjusts a control knob (not expressly shown) operably associated with thermostat and controller 703 to a desired temperature setting. In one embodiment, more than one control knob may be provided to set a temperature for one or more of cavities 708. Heat generator 708 generates heat and heat transfer element 707 couples heat to cavities 703. In one embodiment, heat generator 708 may produce a specific power output (i.e. voltage or current) and couple the voltage to cavities 703 using heat transfer element 707. Cavities 708 may then include a heat element operable to generate heat local to cavities 708. Upon a desired temperature being reached, illuminator 704 illuminates and speaker 705 produces audio output indicating to a user that a desired temperature has been provided and a liquid contained within liquid container 709 is ready for use.

Note that although an embodiment of the invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element (s) that may cause any benefit, advantage, or solution to occur or become more pronounced are not to be construed as a critical, required, or essential feature or element of any or all the claims. Accordingly, the invention is not intended to be limited to the specific form set forth herein, but on the contrary, it is intended to cover such alternatives, modifications, and equivalents, as can be reasonably included within the spirit and scope of the invention.

What is claimed is:

1. An apparatus for altering a temperature state of a liquid within a container comprising:
   an oval housing having a top portion, a bottom portion, and a middle portion having a front side and a rear side, the top portion having a width and a depth;
   a plurality of cavities positioned along the width and having substantially cylindrical openings and sized to receive a portion of a liquid container and wherein each cavity comprises a separate adjustable thermostat, said thermostats each having a control knob and operable to control a temperature setting for each cavity;
   heat generating electronics housed within the housing including:
   a heat transfer element integrated as part of each cavity, the heat transfer element operable to alter a temperature state of each cavity;
   a heat generator mounted within the housing and thermally coupled to the heat transfer element to collectively alter a temperature state of each cavity;
   a thermostat operably coupled to the heat generator to alter the temperature state of each of cavity;
   a speaker electronically coupled to the thermostat and operable to produce sound when the temperature state of each cavity reaches the desired temperature; and
   a set of power sources operably coupled to the electronics to power the electronics wherein the power sources consist of both an electrical cord and a battery.

2. The apparatus of claim 1 further comprising:
   a power switch accessible along a portion of the housing and operably coupled to the power source and the electronics to power the electronics.

3. The apparatus of claim 1 wherein the liquid container comprises a refillable containing having a durable plastic and sized to fit within at least one of the cavities.

4. The apparatus of claim 1 further comprising each cavity positioned along the width and approximately centered to the width.

5. The apparatus of claim 1 wherein the housing further comprises a substantially waterproof housing.

6. The apparatus of claim 1 wherein the heat transfer element comprises a thermal conductor coupled to a thermally conductive material provided as a portion of the cavity.

7. The apparatus of claim 6 wherein the thermally conductive material comprises aluminum.

8. The apparatus of claim 1 wherein the housing comprises plastic.

9. The apparatus of claim 1 further comprising an illuminator electronically coupled to the thermostat to select a desired temperature setting, the illuminator operable to illuminate in response to providing the desired temperature.

10. The apparatus of claim 1 further comprising:
    cavity heating means for altering the temperature state of a cavity;
    heat generating means for altering the temperature state; and
    temperature setting means for regulating heat provided to alter the temperature state of a liquid within the liquid container.

11. An apparatus for altering a temperature state of a liquid within a container comprising:
    an oval shaped housing having a top portion, a bottom portion, and a middle portion having a front side and a rear side, said top portion having a width and a depth, the oval shaped housing containing three cavities having substantially cylindrical openings and sized to receive a portion of a liquid container, the cavities positioned along the width and approximately centered along the width and the depth;
    heat generating electronics housed within the housing including:
    a heat transfer element integrated as part of each cavity, the heat transfer element operable to alter a temperature state of each cavity;
    a heat generator mounted within the housing and thermally coupled to the heat transfer element to collectively alter the temperature state of each cavity;
    a thermostat operably coupled to the heat generator to provide a setting to alter the temperature state of the cavity; and wherein each cavity comprises a separate adjustable thermostat, said thermostats each having a control knob and operable to control a temperature setting for each cavity;
    a speaker electronically coupled to the thermostat and operable to produce sound when the temperature state of each cavity reaches the desired temperature; and
    a set of power sources operably coupled to the electronics to power the electronics wherein the power sources consist of both an electrical cord and a batter.

12. The apparatus of claim 11 wherein the oval shaped housing comprises plastic.

13. The apparatus of claim 11 wherein the oval shaped housing further includes:
    a housing height ranging between approximately four (4) and five (5) inches;
    a housing depth ranging between approximately five (5) and six (6) inches; and
    a housing width of approximately twelve (12) inches.

* * * * *